United States Patent [19]

Fukahori et al.

[11] Patent Number: 4,830,927

[45] Date of Patent: May 16, 1989

[54] ANTI-SEISMIC BEARING AND ASSEMBLY OF ANTI-SEISMIC BEARINGS

[75] Inventors: Yoshihide Fukahori, Hachioji; Hiromu Kojima, Higashimurayama; Akihiko Ogino, Kodaira, all of Japan

[73] Assignee: Bridgestone Corporation, Tokyo, Japan

[21] Appl. No.: 7,302

[22] Filed: Jan. 27, 1987

[30] Foreign Application Priority Data

| Feb. 7, 1986 | [JP] | Japan | 61-25297 |
| Mar. 31, 1986 | [JP] | Japan | 61-74040 |
| Mar. 31, 1986 | [JP] | Japan | 61-74041 |

[51] Int. Cl.$^4$ .................................... E02D 27/34
[52] U.S. Cl. .................................... 428/495; 52/167; 248/609; 248/621; 428/462; 428/465; 428/492; 428/493; 428/494; 428/497; 428/521
[58] Field of Search ............... 52/167; 248/609, 621; 428/462, 521, 465, 492, 493, 494, 497; 14/16.1

[56] References Cited

U.S. PATENT DOCUMENTS

| 3,134,585 | 5/1964 | Trask . | |
| 3,544,176 | 12/1970 | Slater | 52/167 |
| 4,121,393 | 10/1978 | Renault et al. | 52/167 |
| 4,527,365 | 7/1985 | Yoshizawa et al. | 52/167 |

FOREIGN PATENT DOCUMENTS

| 2628276 | 1/1975 | Fed. Rep. of Germany | 52/167 |
| 3151508 | 7/1983 | Fed. Rep. of Germany . | |
| 2316412 | 1/1977 | France . | |
| 2560265 | 8/1985 | France . | |
| 0148045 | 11/1970 | Japan . | |
| 0070533 | 6/1977 | Japan | 428/462 |
| 0129434 | 10/1980 | Japan . | |
| 0151743 | 11/1981 | Japan . | |
| 0036450 | 3/1983 | Japan | 428/462 |
| 0176338 | 10/1984 | Japan . | |
| 0293240 | 12/1986 | Japan . | |

OTHER PUBLICATIONS

Search report (French Patent Office) from corresponding application.

Primary Examiner—George F. Lesmes
Assistant Examiner—James B. Monroe
Attorney, Agent, or Firm—Frank J. Jordan; C. Bruce Hamburg; Manabu Kanesaka

[57] ABSTRACT

An anti-seismic bearing made up of a plurality of rigid plates and viscoelastic flexible plates laminated alternately, said flexible plates being made of a material characterized by that the hysteresis ratio at 100% deformation at 25° C. is 0.15 to 0.60, the loss tangent (tan δ) at 0.01% deformation, 5 Hz, at 25° C. is 0.010 to 0.194, and the ratio $E(-10)/E(30)$ is 1.0 to 3.0, where $E(-10)$ is a storage modulus at 0.01% deformation 5 Hz, at −10° C. and $E(30)$ is a storage modulus at 0.01% deformation, 5 Hz, at 30° C.

An assembly composed of low-damping anti-seismic bearings and high-damping anti-seismic bearings arranged in parallel such that the anti-seismic bearings support the vertical load and undergo elastic deformation in the horizontal direction.

20 Claims, 3 Drawing Sheets

ANTI-SEISMIC BEARING AND ASSEMBLY OF ANTI-SEISMIC BEARINGS

FIELD OF THE INVENTION AND RELATED ART STATEMENT

The present invention relates to an anti-seismic bearing of such a structure that a plurality of rigid plates and viscoelastic flexible plates are bonded to each other alternately. More particularly, it relates to an anti-seismic bearing having both the seismic isolating effect and the damping effect. It also relates to an assembly of such anti-seismic bearings which has both the seismic isolating effect and the damping effect so that it isolates the structure and equipment from seismic force.

A laminate structure composed of rigid plates like steel plates and viscoelastic plates like rubber plates is commonly used as a bearing member which is required to have the vibration insulating and absorbing properties.

The anti-seismic bearing exhibits its function and effect when it is inserted between a rigid structure such as a concrete building and a foundation thereof. Because of its low shear modulus, it shifts the natural frequency of a concrete building from the seismic frequency. As the result, the building on the anti-seismic bearings receives only a very little acceleration of earthquake. Nevertheless, the building is still subject to the slow horizontal ground motion, which, when great, would cause damage to the building, piping, wiring, and other equipment. To reduce the displacement caused by horizontal motion, the anti-seismic bearings are installed in combination with dampers. The installation of both anti-seismic bearings and dampers needs complex works and adds to cost to a great extent. A conceivable way to avoid this situation is to hollow out the anti-seismic bearing and fill the hollow with lead. Lead undergoes plastic deformation at the time of earthquake, imparting the damping effect to the anti-seismic bearing. The disadvantage of the lead-containing anti-seismic bearing is that when it greatly deforms in an energetic earthquake, the rigid plates such as steel plates damage the lead and the damaged lead in turn damages the flexible plates such as rubber plates, with the series of damages eventually breaking the entire anti-seismic bearing. In addition, the damaged lead readily breaks after repeated large deformation.

There is a problem in the case where the anti-seismic bearings are used in combination with plastic dampers made of a soft metal which undergoes plastic deformation immediately when it receives a seismic force. The problem is that although the dampers absorb the seismic energy, resonance occurs in the high-frequency region because the plastic damper has a high modulus.

OBJECT AND SUMMARY OF THE INVENTION

It is an object of the present invention to provide an anti-seismic bearing which produces both the seismic isolating effect and the damping effect.

It is another object of the invention to provide an anti-seismic bearing which has the seismic isolating effect, damping effect, and creep resistance.

The anti-seismic bearing of the invention is made up of a plurality of rigid plates and viscoelastic flexible plates laminated alternately, with the flexible plates being made of a material characterized by that the hysteresis ratio at 100% deformation at 25° C. is 0.15 to 0.60, the loss tangent (tan δ) at 0.01% deformation, 5 Hz, at 25° C. is 0.010 to 0.194, and the ratio $E(-10)/E(30)$ is 1.0 to 3.0, where $E(-10)$ is a storage modulus at 0.01% deformation, 5 Hz, at $-10°$ C. and $E(30)$ is a storage modulus at 0.01% deformation, 5 Hz, at 30° C.

The assembly of anti-seismic bearings of the invention is composed of high-damping anti-seismic bearings and low-damping anti-seismic bearings installed in parallel.

In general, a damper should preferably be made of a material having a high hysteresis loss. Unfortunately, however, a material having a high hysteresis loss is more liable to creep and the modulus of such a material is more dependent on temperature. These properties are not desirable for anti-seismic bearings to support a building. The flexible plates constituting the anti-seismic bearing of the invention has a hysteresis loss in a specific range and also has a modulus which is less dependent on temperatures. Therefore, they impart the seismic isolation property and damping property to the anti-seismic bearing.

For the assembly of anti-seismic bearings to be effective as a damper, each anti-seismic bearing should preferably have a high hysteresis loss, as mentioned above. However, a high hysteresis loss is generally achieved when the material has a higher creep and a more temperature-dependent modulus.

According to the present invention, anti-seismic bearings having high damping performance and anti-seismic bearings having low damping performance are installed parallel in such a manner that the latter support a part of the vertical load. This arrangement produces the good seismic isolating effect and damping effect.

DESCRIPTION OF THE PREFERRED EMBODIMENTS

Figure 1:
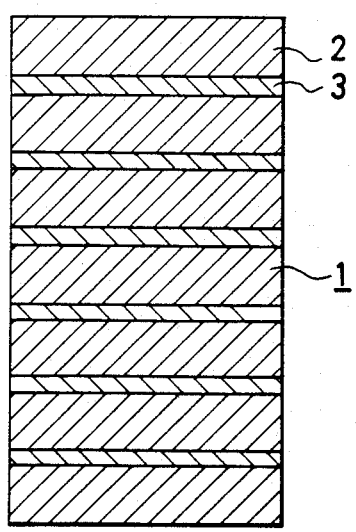
FIG. 1 is a longitudinal sectional view of the anti-seismic bearing pertaining to one example of the invention.

FIG. 1 is a longitudinal sectional view of the anti-seismic bearing 1 pertaining to an example of the invention. The anti-seismic bearing 1 is composed of flexible plates 2 of rubber or the like having the viscoelastic property and rigid plates 3 of steel or the like having rigid property, said plates being laminated alternately.

The following is a detailed description of the material from which the flexible plates are made.

Hysteresis ratio:

In general, the value of loss tangent (tan δ) is used as a measure to represent the hysteresis loss characteristics and damping characteristics of a material. However, tan δ is not an adequate parameter to describe the hysteresis loss characteristics of a material for anti-seismic bearings which undergo as great deformation as 100 to 200% at the time of earthquake, because it is a quantity which is measured as the delay of response to the stimuli of very small amplitude applied to a material.

Figure 2:
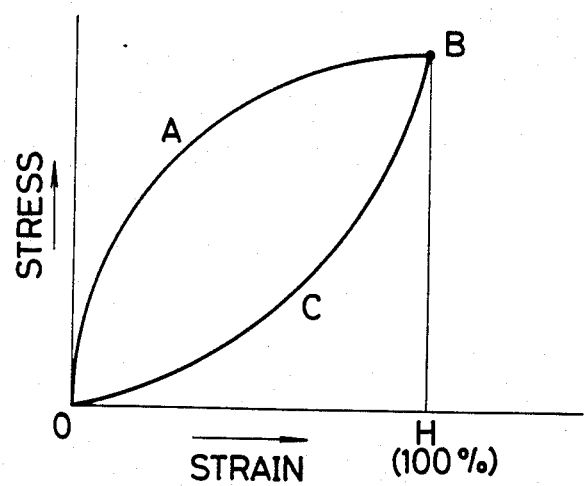
FIG. 2 is a graph showing the stress-strain curve of a material.

For this reason, in the present invention, the hysteresis ratio ($h_{100}$) of a material at 100% deformation at 25° C. is used as a measure of the loss characteristics. Incidentally, the $h_{100}$ is given by the ratio of area OABCO to area OABHO in the stress-strain curve in FIG. 2 which is obtained at an extension rate of 200 mm/min.

As mentioned above, the $h_{100}$ should preferably be as great as possible from the standpoint of damping effect. However, a material having a high $h_{100}$ has a large amount of plastic deformation. For a given material to be satisfactory in both characteristics, the value of $h_{100}$ at 25° C. should be in the range of $0.15 \leq h_{100} \leq 0.60$, preferably $0.20 \leq h_{100} \leq 0.55$. Loss tangent tan δ:

The anti-seismic bearings support the weight of a building at all times; therefore, they are subject to creeping and the creeping of the anti-seismic bearings leads to the sinking of a building. What is important to note here is that the initial deformation of the material by the dead weight of a building is as small as 1% or less. Thus the effect of the loss characteristics of a material on the creep characteristics of an anti-seismic bearing occurs in such a small amount of strain.

Creep should be as small as possible from the standpoint of building stability. Therefore, the tan δ to represent the loss characteristics should preferably be small in this strain region. In other words, the tan δ measured by dynamic test at a strain of 0.01%, 5 Hz, at 25° C. should be in the range of $0.010 \leq \tan \delta \leq 0.194$, preferably $0.020 \leq \tan \delta \leq 0.190$, and more preferably $0.025 \leq \tan \delta \leq 0.185$. Temperature dependence of modulus:

The most important factors which affect the seismic isolation characteristics are the longitudinal spring constant and lateral spring constant. They are directly proportional to the modulus of a material.

Anti-seismic bearings are exposed to the atmosphere at all times when they are in use. The atmospheric temperature would be lower than $-10°$ C. in winter and higher than 30° C. in summer. The modulus of a rubber material is dependent more or less on temperature, and a rubber material becomes rigid at low low temperatures. In addition, the greater the loss of a material, the greater the temperature dependence.

According to the present invention, the material should have a modulus which is as little temperature-dependent as possible, and the ratio of the storage modulus measured by dynamic test at a strain of 0.01%, 5 Hz, at $-10°$ C. to the storage modulus at a strain of 0.01%, 5 Hz, at 30° C. should be in the range of $$1.0 \leq \frac{E(-10)}{E(30)} \leq 3.0, \text{ preferably}$$

$$1.0 \leq \frac{E(-10)}{E(30)} \leq 2.5, \text{ and more preferably}$$

$$1.0 \leq \frac{E(-10)}{E(30)} \leq 2.3.$$

The material for the flexible plates which satisfies the abovementioned conditions includes a variety of rubbers such as ethylene propylene rubber (EPR, EPDM), nitrile rubber (NBR), butyl rubber, halogenated butyl rubber, chloroprene rubber (CR), natural rubber (NR), isoprene rubber (IR), styrene butadiene rubber (SBR), and butadiene rubber (BR). Preferable among them are halogenated butyl rubber, EPR, EPDM, CR, NR, IR, BR, and SBR. They may be advantageously used in combination with one another.

A preferred high-loss rubber compound is obtained by blending 100 parts by weight of natural rubber-based compound with 15 to 100 parts by weight of cyclopentadiene resin and/or dicyclopentadiene resin. This compound has the high-loss characteristics of natural rubber and the greatly improved temperature dependence, fracture characteristics, and adhesion characteristics.

It was found that a specific cyclopentadiene resin or dicyclopentadiene resin improves the processability of rubber and the characteristic properties of rubber because of its chemical and physical reactions with rubber which take place at the curing time. The cyclopentadiene resin or dicyclopentadiene resin can be more readily compounded with rubber than ordinary process oil. They affect heat generation and rupture characteristics only a little. The natural rubber-based compound incorporated with these resins are less temperature-dependent and superior in rubber-metal adhesion. In addition, unlike process oil, they hardly migrate after use for a long period of time and they keep the rubber compound stable over a long period of time.

The cyclopentadiene resin or dicyclopentadiene resin to be incorporated into a natural rubber-based compound is a petroleum resin composed mainly of cyclopentadiene or dicyclopentadiene. It includes copolymers of cyclopentadiene or dicyclopentadiene with a polymerizable olefin hydrocarbon and also includes polymers of cyclopentadiene and/or dicyclopentadiene. These resins should contain more than 30%, preferably more than 50% of cyclopentadiene or dicyclopentadiene or a mixture thereof.

The olefin hydrocarbon copolymerizable with cyclopentadiene or dicyclopentadiene includes olefin hydrocarbons such as 1-butene, 2-butene, isobutylene, 1-pentene, 2-pentene, 2-methyl-1-butene, 3-methyl-1-butene, and 2-methyl-2-butene; diolefin hydrocarbons such as butadiene, isoprene, and 3-methyl-1,2-butadiene; and vinyl-substituted aromatic hydrocarbons such as styrene, α-methylstyrene, and vinyl-toluene. They can be copolymerized with cyclopentadiene or dicyclopentadiene through Friedel-Crafts reaction in the presence of a proper catalyst.

In view of the molecular weight and the reactivity of the double bond, the cyclopentadiene resin or dicyclopentadiene resin should preferably have a softening point of 50° to 200° C. (measured by ring and ball method according to JIS K-5902) and a bromine number of 40 to 150 (measured according to ASTM D-1158-57T) so that they produce a desired effect on the vulcanized rubber. The amount of the cyclopentadiene and/or dicyclopentadiene to be incorporated into natural rubber-based compound is 15 to 100 parts by weight, preferably 20 to 80 parts by weight for 100 parts by weight of natural rubber-based compound, so that the resulting rubber compound has the desired processability and loss characteristics.

The natural rubber-based compound may contain BR, NBR, butyl rubber, halogenated butyl rubber, and/or chloroprene rubber. It may also contain a filler, antioxidant, plasticizer, softener, oil, and other commonly used additives, according to need. The resulting rubber compound may be incorporated with a filler, plasticizer, softener, oil antioxidant, and other commonly used additives.

The material constituting the rigid plate 3 is a metal, ceramics, plastics, FRP, polyurethane, wood, paperboard, slate, or decorative laminate. The shape of the flexible plate and rigid plate may be circle, square, pentagon, hexagon, or polygon. The bonding of the flexible plate to the rigid plate may be accomplished by the aid of an adhesive or covulcanization.

Since the anti-seismic bearings are exposed to the atmosphere at all times while they are in use, they are degraded by air, moisture, ozone, ultraviolet light, radiation (in the case of nuclear power station), and sea wind (in the case of seacoast buildings) over a long period of time. In addition, the anti-seismic bearings supporting a building receive a compressive load at all times, and the compressive load produces a considerable amount of local strain in the surface of the rubber layer of 100 to 200% in the case of great earthquake. Such stress and strain promote degradation. Therefore, it is desirable for the peripheral edges of the rigid plates 3 and flexible plates 2 of the anti-seismic bearing 1 to be covered with a covering layer 4 of a rubber material having superior weather resistance.

The rubber material for the covering layer should preferably be a rubbery polymer having superior weather resistance. Examples of such polymers include butyl rubber, acryl rubber, polyurethane, silicone rubber, fluororubber, polysulfide rubber, ethylene propylene rubber (EPR and EPDM), Hypalon, chlorinated polyethylene, ethylene-vinyl acetate rubber, epichlorohydrin rubber, and chloroprene rubber. Preferable among them from the standpoint of weather resistance are butyl rubber, polyurethane, ethylene propylene rubber, Hypalon, chlorinated polyethylene, ethylene-vinyl acetate rubber, and chloroprene rubber. Preferable among them from the standpoint of adhesion to the rubber constituting the flexible plates are butyl rubber, ethylene propylene rubber, and chloroprene, with ethylene propylene rubber being most desirable.

These rubber materials may be used individually or in combination with one another. For the improvement of their physical properties, they may be blended with commercial rubber such as natural rubber, isoprene rubber, styrene butadiene rubber, butadiene rubber, and nitrile rubber. In addition, these rubber materials may be incorporated with additives such as filler, antioxidant, plasticizer, softener, and oil which are commonly used for rubber processing.

Among the above-mentioned covering rubber materials, ethylene propylene rubber is superior in ozone resistance, radiation resistance, oxidation resistance, UV light resistance, heat aging resistance, and low temperature resistance. Ethylene propylene rubber is improved in processability when it is incorporated with cyclopentadiene resin or dicyclopentadiene resin. In addition, these resins improve the properties of the rubber through the chemical reaction and physical action that take place at the curing time.

When 100 parts by weight of a rubber compound composed mainly of ethylene propylene rubber is incorporated with 10 to 40 parts by weight, preferably 10 to 35 parts by weight, of cyclopentadiene resin and/or dicyclopentadiene resin and 5 to 20 parts by weight of rosin derivative, the resulting rubber compound is greatly improved in adhesion to rubber and metal, processability, and rupture property, while keeping the superior weather resistance of ethylene propylene rubber.

The cyclopentadiene resin or dicyclopentadiene resin to be incorporated into a rubber compound composed mainly of ethylene-propylene rubber may be the same one as mentioned above which is incorporated into natural rubber to prepare a high-loss rubber compound suitable as a material for the flexible plates.

The rosin derivative is composed mainly of a mixture of carboxylic acids such as abietic acid and pimaric acid, and it includes, for example, rosin ester, polymeric rosin, hydrogenated rosin, hardened rosin, high rosin, disproportionated rosin zinc, and modified rosin.

The ethylene-propylene rubber includes ethylene-propylene diene rubber (EPDM) containing diene as a third component, ethylene-propylene rubber (EPR) not containing a third component, oil-extended ethylene-propylene diene rubber, and oil-extended EPR. The ethylene-propylene rubber may be blended with general-purpose rubber such as NR, BR, and SBR for the improvement of processability, according to need.

The high weather resistant rubber compound may be incorporated with a vulcanization accelerator selected according to the application. Examples of the vulcanization accelerator include thiazole type accelerators, guanidine type accelerators, thiuram type accelerators, and thiocarbamate type accelerators. Preferable among them are N-cyclohexyl-2-benzothiazole sulfenamide, dibenzothiazyl disulfide, tetramethylthiuram monosulfide, 2-mercaptobenzothiazole, 2-mercaptobenzothiazole cyclohexylamine salt, tetra-2-ethylhexylthiuram disulfide, zinc di-2-ethylhexyldicarbamate, and diphenylguanidine. Particularly desirable among them are N-cyclohexyl-2-benzothiazole sulfenamide and diphenyl guanidine. The desired amount of the vulcanization accelerator is 0.5 to 5 parts by weight. The high weather resistant rubber compound may contain a filler, antioxidant, plasticizer, softener, and oil which are commonly used for rubber processing.

The covering layer 4 should preferably be as thick as possible to produce the maximum effect of protecting the rubber inside. On the other hand, a thick covering layer increases the production cost and requires a prolonged vulcanization time. With these factors taken into account, the thickness of the covering layer 4 should be 1 to 30 mm, preferably 2 to 20 mm, and more preferably 3 to 15 mm. In the case where the anti-seismic bearings are required to have fireproofness, the thickness of the covering layer may exceed 30 mm.

The covering layer 4 may be firmly bonded to the rigid plates 3 and flexible plates 2 by any of the following methods.

(a) The rubber material for the flexible plates 2 (referred to as internal rubber) and the rubber material for the covering layer 4 (referred to as covering rubber) are vulcanized simultaneously.

(b) The internal rubber is vulcanized first and subsequently the covering rubber is vulcanized.

(c) The internal rubber and the covering rubber are vulcanized separately and then they are bonded together with an adhesive.

The bonding of the internal rubber and covering rubber may be promoted by interposing a third rubber layer between them which adheres well to both of them. In addition, the internal rubber and/or covering rubber may be incorporated with additives for the improvement of adhesion.

The anti-seismic bearings undergo great shear deformation as the building on them rocks when an earthquake occurs. This shear deformation leads to an extremely great local strain at the surface layer of the flexible plate adjacent to the flange of the anti-seismic bearing, and this local strain leads to damage and rupture of the anti-seismic bearing.

This local strain results from the flexural deformation of the rigid plate adjacent to the flange. To prevent this local strain, either of the following structures should be adopted. (I) The rigid plate adjacent to the flange has a higher flexural rigidity than the rigid plate at the center. (II) The flexible plate adjacent to the flange has a higher tensile strength than the flexible plate at the center.

In the case of structure (I), the rigid plates of varied flexural rigidity should be arranged so as to satisfy the following conditions. Assuming that the rigid plates are designated $S_1, S_2, S_3, \ldots S_M$ ($S_1$ being adjacent to the flange and $S_M$ being at the center) and their respective rigidity values at 25° C. are $E_{S1}, E_{S2}, E_{S3}, \ldots E_{SM}$, the following relation should be established between the flexural rigidity $E_{S1}$ of the rigid plate $S_1$ and the flexural rigidity $E_{SM}$ of the rigid plate $S_M$.

$$1 \leq \frac{E_{S1}}{E_{SM}} \leq 200 \text{ preferably}$$

$$1 \leq \frac{E_{S1}}{E_{SM}} \leq 75 \text{ more preferably } 1 \leq \frac{E_{S1}}{E_{SM}} \leq 55$$

In addition, the following relation should be established between the flexural rigidity $E_{S2}$ of the rigid plate $S_2$ and the flexural rigidity $E_{SM}$ of the rigid plate $S_M$.

$$1 \leq \frac{E_{S2}}{E_{SM}} \leq 50 \text{ preferably } 1 \leq \frac{E_{S2}}{E_{SM}} \leq 30$$

If necessary, the flexural rigidity $E_{S3}$ of the rigid plate $S_3$ may be greater than the flexural rigidity $E_{SM}$ of the rigid plate $S_M$.

In this case, the respective rigidity values $E_{S1}, E_{S2}, E_{S3}, \ldots E_{SM}$ of the rigid plates $S_1, S_2, S_3, \ldots S_M$ may be set up so as to satisfy the following conditions. $E_{S1} \leq E_{S2} \leq E_{S3} \leq \ldots \leq E_{SM}$ (provided that the case in which $E_{S1} = E_{S2} = E_{S3} = \ldots = E_{SM}$ is excluded). It is also possible to set up randomly such that each of $E_{S1}$, $E_{S3}$, and $E_{S7}$ (the flexural rigidity of the 7th rigid plate $S_7$ counted from the flange side) is greater than $E_{SM}$. In short, according to the present invention, the rigid plate adjacent to the flange should have a higher flexural rigidity than the rigid plate at the center. The flexural rigidity of the individual rigid plates should be properly established according to the estimated direction and magnitude of shocks applied to the anti-seismic bearings.

There are several possible ways to make the flexural rigidity of the rigid plate adjacent to the flange higher than that of the rigid plate at the center. The following two ways are adequate. (1) The rigid plate adjacent to the flange and the rigid plate at the center are made of the same material but the former is thicker than the latter. (2) The rigid plate adjacent to the flange and the rigid plate at the center are made of different materials, the material for the former having a higher flexural rigidity than that for the latter.

In the case of (1), the plate thickness to give a flexural rigidity required is easily calculated because doubling the plate thickness increases the flexural rigidity $2^3$ times.

In the case of structure (II), the flexible plates of varied tensile strength should be arranged so as to satisfy the following conditions. Assuming that the flexible plates are designated $R_1, R_2, R_3, \ldots R_M$ ($R_1$ being adjacent to the flange and $R_M$ being at the center) and their respective values of tensile strength at 100% elongation (modulus 100) at 25° C. are $E_{R1}, E_{R2}, E_{R3}, \ldots E_{RM}$, the following relation should be established between the tensile strength $E_{R1}$ of the flexible plate $R_1$ and the tensile strength $E_{RM}$ of the flexible plate $R_M$.

$$1 \leq \frac{E_{R1}}{E_{RM}} \leq 50 \text{ preferably}$$

$$1 \leq \frac{E_{R1}}{E_{RM}} \leq 30 \text{ more preferably } 1 \leq \frac{E_{R1}}{E_{RM}} \leq 15$$

In addition, the following relation should be established between the stress $E_{R2}$ of the flexible plate $R_2$ and the stress $E_{RM}$ of the flexible plate $R_M$.

$$1 \leq \frac{E_{R2}}{E_{RM}} \leq 15 \text{ preferably } 1 \leq \frac{E_{R2}}{R_{RM}} \leq 10.$$

If necessary, the tensile strength $E_{R3}$ of the flexible plate $R_3$ may be greater than the tensile strength $E_{RM}$ of the flexible plate $R_M$.

In this case, the respective values of tensile strength $E_{R1}, E_{R2}, E_{R3}, \ldots E_{RM}$ of the flexible plates $R_1, R_2, R_3, \ldots R_M$ may be set up so as to satisfy the following conditions. $E_{R1} \leq E_{R2} \leq E_{R3} \leq \ldots \leq E_{RM}$ (provided that the case in which $E_{R1} = E_{R2} = E_{R3} = \ldots = E_{RM}$ is excluded). It is also possible to set up such that each of $E_{R1}, E_{R3}$, and $E_{R7}$ (the tensile strength of the 7th rigid plate $R_7$ counted from the flange side) is greater than $E_{RM}$.

There are several possible ways to make the tensile strength of the flexible plate adjacent to the flange higher than that of the flexible plate at the center. The following two ways are adequate. (1) The flexible plate adjacent to the flange and the flexible plate at the center are made of the same base material but the base material for the former contains more filler than that for the latter. (2) The flexible plate adjacent to the flange and the flexible plate at the center are made of different base materials, the base material for the former having a higher tensile strength than that for the latter.

According to the present invention, it is desirable that the flexible plate $R_M$ at the center should have a tensile strength $E_{RM}$ of 5 to 40 kg/cm$^2$ at 100% elongation at 25° C. The above-mentioned arrangement reduces the local strain resulting from the flexural deformation of the rigid plate adjacent to the flange. This minimizes the possibility of the anti-seismic bearing being damaged and broken by local strain.

The anti-seismic bearing formed by laminating flexible plates and rigid plates has a disadvantage that an excessive stress concentrates at that part of the flexible plate which is in contact with the edge of the rigid plate and the concentrated stress damages that part.

This disadvantage can be overcome in this invention by adopting the following structure. The edge of the rigid plate is finished round and covered with a flexible material, so that all the rigid plates are embedded in the flexible material.

Figure 4:
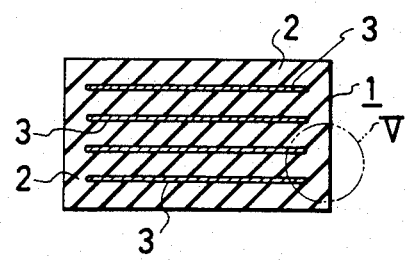
FIG. 4 is a longitudinal sectional view of the anti-seismic bearing pertaining to further another example of the invention.
Figure 5:
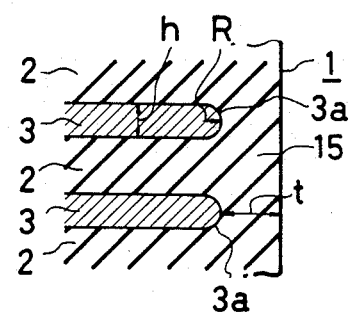
FIG. 5 is an enlarged sectional view of the part indicated by V in FIG. 4.

FIG. 4 is a longitudinal sectional view of the anti-seismic bearing constructed as mentioned just above. The anti-seismic bearing 1 is formed by laminating the flexible plates 2 of viscoelastic rubber or the like and the rigid plates 3 of steel plate or the like. In this example, the periphery of the rigid plate 3 has a round curve as shown in FIG. 5 (a partly enlarged view of the part indicated by V in FIG. 4). The periphery 3a is covered with the same material as the flexible plate 2 (preferably the above-mentioned rubber material 15 having superior weather resistance), so that it is isolated from the atmosphere. In this invention, the rigid plate 3 is completely covered with the rubber material 15 and therefore the rigid plate 3 is protected from corrosion by the atmosphere. Covering the periphery 3a of the rigid plate 3 with the rubber material 15 and finishing the periphery 3a of the rigid plate 3 round minimize the local stress applied to the flexible material in contact with the periphery 3a.

In this example, the periphery 3a of the rigid plate 3 should have a radius of curvature (R) which satisfies the following condition.

$$\frac{h}{4} \leq R \leq h,$$

and preferably $$\frac{h}{3} \leq R \leq \frac{2}{3} h$$

(where h represents the thickness of the rigid plate 3).

Figure 6:
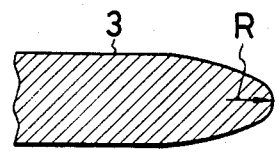
FIG. 6 is an enlarged sectional view of the important part of the anti-seismic bearing pertaining to another example of the invention.

In the case where $$R < \frac{h}{2},$$

the peripheral curve should be connected to the straight part with a smooth transition curve as shown in FIG. 6. The example shown in FIG. 6 produces the same effect as the examples shown in FIGS. 4 and 5.

The local stress that occurs in the rubber material in contact with the periphery of the rigid plate 3 is gradually reduced as the thickness of the flexible plate 2 is increased. However, the reduction of local stress levels off beyond a certain thickness. In this invention, therefore, the thickness (t mm) of the rubber material (15) should be in the range of $1 \leq t \leq 20$, preferably $2 \leq t \leq 15$, and more preferably $3 \leq t \leq 10$.

The effect of the example of the invention is demonstrated as follows: In the case where the rigid plate 3 is a 3 mm thick round iron plate 220 mm in diameter and the flexible plate 2 is a 22 mm thick round rubber plate 220 mm in diameter, the maximum local stress reaches 55% when a load is applied to compress the rubber plate 2 by 4% on an average. In contrast, in the case of the example shown in FIGS. 4 and 5 (in which $$R = \frac{h}{2}$$

and t=5 mm), the maximum stress was reduced to 14%.

The anti-seismic bearing not only isolates a building from seismic shocks but also exhibits the vibration isolating and damping performance.

The anti-seismic bearing assembly is composed of high-damping anti-seismic bearings and conventional low-damping anti-seismic bearings, the former exhibiting the damping performance required for earthquake protection and the latter supporting a part or all of the vertical load of a building or equipment. Because of this combination, the creeping of the assembly is limited to a very low level.

Figure 7:
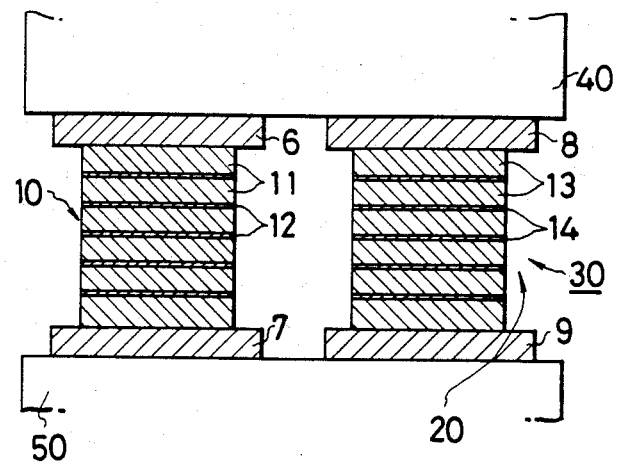
FIG. 7 is a sectional view of the assembly of anti-seismic bearings pertaining to an example of the invention.

FIG. 7 shows a longitudinal section view showing the anti-seismic bearing assembly 30 installed between the building 40 and the foundation 50 in an example of the invention.

The anti-seismic bearing assembly 30 is composed of the high-damping anti-seismic bearing 10 and the low-damping anti-seismic bearing 20 arranged in parallel. In FIG. 7, flanges are indicated by reference numerals 6, 7, 8, and 9. Each of the anti-seismic bearings 10 and 20 is formed by laminating alternately flexible plates (11, 13) of rubber or the like and rigid plates (12, 14) of steel or the like.

The ratio (in terms of number and sectional area) of the high-damping anti-seismic bearings to the low-damping anti-seismic bearings to be installed in parallel, and the ratio of the rigid plates (12, 14) to the flexible plates (11, 13) should be determined according to the earth-quake protection performance required for a particular building or equipment for which the anti-seismic bearing assembly is installed, the spring constant, the temperature dependence of spring constant, the damping effect, and the creep resistance.

The flexible plate 11 of the high-damping anti-seismic bearing 10 should be made of high-damping rubber or high-hysteresis rubber characterized by that the hysteresis ratio $h_{100}$ at 100% deformation at 25° C. is 0.25 to 0.70, and the ratio $E(-10)/E(30)$ is 1.0 to 3.0, where $E(-10)$ is a storage modulus at 0.01% deformation, 5 Hz, at $-10°$ C. and $E(30)$ is a storage modulus at 0.01% deformation, 5 Hz, at 30° C.

The flexible plate 13 of the low-damping anti-seismic bearing 20 should be made of low-damping rubber or low-hysteresis rubber characterized by that the hysteresis ratio $h_{100}$ at 100% deformation at 25° C. is 0.05 to 0.20, and the ratio $E(-10)/E(30)$ is 1.0 to 1.5, where $E(-10)$ is a storage modulus at 0.01% deformation, 5 Hz, at $-10°$ C. and $E(30)$ is a storage modulus at 0.01% deformation, 5 Hz, at 30° C.

The preferred ranges are given above for reasons mentioned in the previous sections concerning the hysteresis of ratio of material and the temperature dependence of modulus of material.

The high-hysteresis rubber material should preferably have an $h_{100}$ (at 25° C.) in the range of $0.25 \leq h_{100} \leq 0.70$.

The low-hysteresis rubber material should preferably have an $h_{100}$ (at 25° C.) in the range of $0.05 \leq h_{100} \leq 0.20$.

In the case of high-hysteresis rubber, the temperature dependence of modulus should be such that the ratio of the storage modulus measured by dynamic test at a 0.01% strain, 5 Hz, at $-10°$ C. to the storage modulus at a 0.01% strain, 5 Hz, at 30° C. is in the range of $$1.0 \leq \frac{E(-10)}{E(30)} \leq 3.0, \text{ and preferably } 1.0 \leq \frac{E(-10)}{E(30)} \leq 2.5.$$

In the case of low-hysteresis rubber, the ratio should be in the range of $$1.0 \leq \frac{E(-10)}{E(30)} \leq 1.5.$$

The high-hysteresis rubber material used in the present invention may be selected from any materials that satisfy the above-mentioned conditions. A preferred example is a vulcanized rubber composed of 100 parts by weight of one or more than one kind of rubber selected from the following and 15 to 100 parts by weight of cyclopentadiene resin or dicyclopentadiene resin. Ethylene-propylene rubber (EPR, EPDM), nitrile rubber (NBR), butyl rubber, halogenated butyl rubber, chloroprene rubber (CR), natural rubber (NR), isoprene rubber (IR), styrene butadiene rubber (SBR), and butadiene rubber (BR). This vulcanized rubber is also superior in adhesion to metal. The rubber material may be incorporated with a filler, plasticizer, softener, and oil which are commonly used for rubber processing.

The low-hysteresis rubber material used in the present invention may be selected from any materials that satisfy the above-mentioned conditions.

The material constituting the rigid plates 12 and 14 in the anti-seismic bearing assembly may be a metal (such as steel), ceramics, plastics, FRP, polyurethane, wood, paperboard, slate, and decorative laminate. The shape of the rubber plates 11 and 13 and the rigid plates 12 and 14 may be circle, square, pentagon, hexagon, or polygon. The bonding of the rubber plate to the rigid plate may be accomplished by the aid of an adhesive or co-vulcanization.

Figure 3:
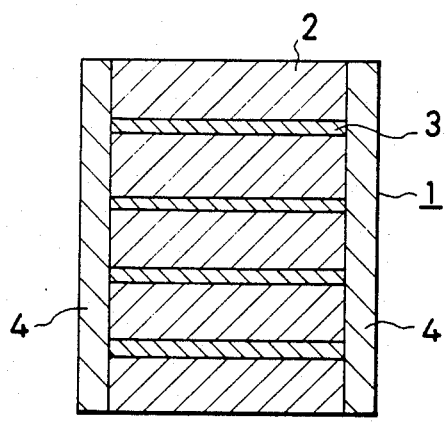
FIG. 3 is a longitudinal sectional view of the anti-seismic bearing pertaining to another example of the invention.

Since the anti-seismic bearing assembly is exposed to the atmosphere at all times while in use, it is degraded by air, moisture, ozone, ultra-violet light, radiation (in the case of nuclear power station), and sea wind (in the case of seacoast buildings) over a long period of time. Therefore, it is desirable that the high-damping anti-seismic bearing 10 and the low-damping anti-seismic bearing 20 should be covered with the above-mentioned weather resistant rubber material as shown in FIG. 3.

Figure 8:
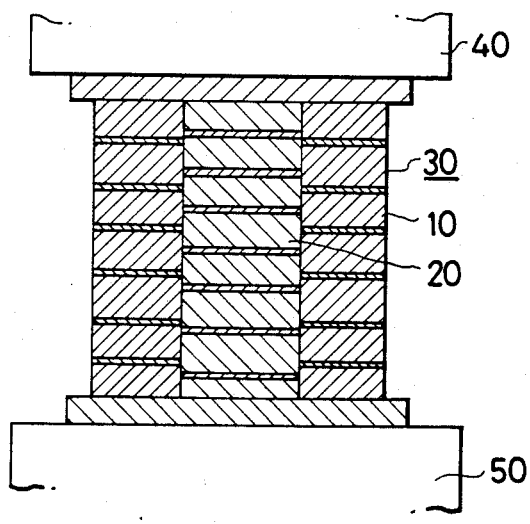
FIG. 8 is a sectional view of the assembly of anti-seismic bearings pertaining to another example of the invention.

The anti-seismic bearing assembly as shown in FIG. 7 is an example of the invention, and it should not be construed to limit the scope of the invention. In an alternative example, for instance, the high-damping anti-seismic bearing 10 and the low-damping anti-seismic bearing 20 may be integrally combined as shown in FIG. 8. In the case of the anti-seismic bearing assembly as shown in FIG. 8, the high-damping anti-seismic bearing 20 is inserted into the hollow of the low-damping anti-seismic bearing 10. The arrangement of the two anti-seismic bearings may be reversed.

The flexible plates that meet the above-mentioned three requirements permit the anti-seismic bearing to produce the outstanding seismic isolation effect as well as the good damping effect. Therefore, the anti-seismic bearing of the invention absorbs seismic shocks and isolates the building from ground motion. Thus it protects the building, piping, wiring, and other equipment from earthquake and stably supports the building.

The anti-seismic bearing assembly is composed of the high-damping anti-seismic bearings and the low-damping anti-seismic bearings. The former produces the seismic isolation effect and good damping effect, and the latter produces the good seismic isolation effect and exhibits the good creep resistance. Therefore, the anti-seismic bearing assembly reduces shocks transmitted to the building and firmly support the building over a long period of time. The anti-seismic bearing assembly produces the seismic isolation effect as well as the damping effect.

The flexible plates constituting the anti-seismic bearing or the flexible plates constituting the high-damping anti-seismic bearing of the anti-seismic bearing assembly are made of a high-loss rubber compound composed of 100 parts by weight of natural rubber-based compound and 15 to 100 parts by weight of cyclopentadiene resin and/or dicyclopentadiene resin. This rubber compound provides the superior high-loss characteristics, rupture characteristics, elongation characteristics, temperature dependence, rubber-metal adhesion, and long-term stability.

The anti-seismic bearing and the anti-seismic bearing assembly are constructed such that the peripheral parts of the flexible plates and rigid plates are covered with a high weather-resistant rubber compound composed of 100 parts by weight of ethylene-propylene rubber, 10 to 40 parts by weight of cyclopentadiene resin and/or dicyclopentadiene resin, and 5 to 20 parts by weight of rosin derivative. This rubber compound protects the anti-seismic bearing over a long period of time because of its good ozone resistance, radiation resistance, oxidation resistance, heat aging resistance, low-temperature property, adhesion to metal and other rubbers, elongation at break, and mechanical properties. Therefore, the anti-seismic bearing has a very good durability.

The effect of the high-loss rubber compound and high weather-resistant rubber compound suitable in this invention will be demostrated with reference to the following experiment examples.

EXPERIMENT EXAMPLE 1

Rubber compounds of the formulations as shown in Table 1 were produced, and their physical properties were examined. The results are also shown in Table 1.

It is noted from Table 1 that the rubber compound No. 4 (Comparative Example) has a high temperature dependence and a low elongation at break because it contains a large amount of aromatic oil. In contrast, the high-loss rubber compounds Nos. 1 to 3 incorporated with dicyclopentadiene resin are superior in loss characteristics, temperature dependence, rubber rupture characteristics, and adhesion. In other words, they have well-balanced properties.

TABLE 1

| Items | Example 1 | Example 2 | Example 3 | Comparative Example 4 |
|---|---|---|---|---|
| Formulation (parts by weight) | | | | |
| Rubber | | | | |
| NBR | 70 | 70 | 70 | — |
| BR | 30 | 30 | 30 | — |
| SBR*3 | — | — | — | 100 |
| Carbon black | 50 | 70 | 90 | 130 |
| Dicyclopentadiene resin*1 | 30 | 50 | 70 | — |
| Aromatic oil | — | — | — | 110 |
| High styrene SBR*2 | — | — | — | 10 |

TABLE 1-continued

| Items | Example 1 | Example 2 | Example 3 | Comparative Example 4 |
|---|---|---|---|---|
| Sulfur | 1.5 | 1.5 | 1.5 | 1.5 |
| Physical properties | | | | |
| Loss characteristics $h_{100}$*4 | 0.38 | 0.51 | 0.60 | 0.52 |
| Temp. dependence $E(-10)/E(+30)$*5 | 1.49 | 1.57 | 1.67 | 3.15 |
| Elongation at break $E_b$ (%)*6 | 860 | 870 | 760 | 700 |
| Tensile strength at 100% strain $Md_{100}$ (kg/cm$^2$)*7 | 10.6 | 9.6 | 10.5 | 11.0 |

Note to Table 1
*1: Polymer of dicyclopentadiene having a softening point of 116° C. and a bromine number of 65.
*2: Styrene 55% and butadiene 45%
*3: Styrene 23.5%
*4: The ratio of hysteresis at 100% deformation ot 25° C. It is a measure of loss characteristics. Extension speed at 200 mm/min. The $h_{100}$ is given by the ratio of area OABCO to area OABHO of the stress-strain curve shown in FIG. 2.
*5: The ratio of the storage modulus at $-10°$ C. to the storage modulus at $+30°$ C., both measured by dynamic test at a 0.01% strain, 12 Hz. It is an index representing the temperature dependence.
*6: Elongation at break measured at an extension speed of 300 mm/min at 25° C.
*7: Stress at 100% strain measured at an extension speed of 300 mm/min at 25° C.

EXPERIMENT EXAMPLE 2

Rubber compounds of the formulations as shown in Table 2 were produced, and their physical properties were examined. The results are also shown in Table 2. The physical properties were all measured at 25° C.

It is noted from Table 2 that the rubber compounds Nos. 9 and 10 (Comparative Examples) have a low elongation at break and are poor in adhesion to iron plates and natural rubber. In contrast, the high-weather resistant compounds Nos. 5 and 8 incorporated with dicyclopentadiene resin and high rosin have a high elongation at break and breaking strength and are superior in adhesion to metal and natural rubber compounds.

TABLE 2

| Items | Example 5 | Example 6 | Example 7 | Example 8 | Comparative 9 | Example 10 |
|---|---|---|---|---|---|---|
| Formulation (parts by weight) | | | | | | |
| Rubber: | | | | | | |
| EPDM | 70 | 70 | 70 | 70 | 70 | 100 |
| NR | 30 | 30 | 30 | 30 | 30 | — |
| ISAF carbon | 40 | 40 | 40 | 40 | 30 | 30 |
| Dicyclopentadiene resin*1 | 18 | 27 | 14 | 21 | — | — |
| High rosin | 9 | 10 | 14 | 9 | — | — |
| Spindle oil | — | — | — | — | 20 | 20 |
| Sulfur | 1.5 | 1.5 | 1.5 | 1.5 | 1.5 | 1.5 |
| Vulcanization accelerator*2 | | | | | | |
| CZ | 2.7 | 2.5 | 2.5 | 2.5 | — | — |
| TS | — | — | — | — | 2.3 | 2.3 |
| DPG | — | — | — | 1 | — | — |
| Antioxidant 810NA | 1 | 1 | 1 | 1 | 1 | 1 |
| Physical properties | | | | | | |
| Modulus at 100% elongation (kg/cm$^2$) | 17 | 11 | 14 | 14 | 23 | 19 |
| Elonagation at break (%) | 700 | 840 | 800 | 780 | 370 | 280 |
| Breaking strength (kg/cm$^2$) | 141 | 110 | 152 | 156 | 78 | 80 |
| Rubber/rubber bond strength (kg/in)*3 | 70 | 50 | 70 | 80 | 20 | 6 |
| Rubber/metal bond strength (kg/in)*4 | 87 | 80 | 80 | 87 | 40 | 35 |

Note to Table 2
*1: Polymer of dicyclopentadiene having a softening point of 116° C. and a bromine number of 65.
*2: CZ: N—cyclohexyl-2-benzothiazole sulfenamide TS: Tetramethylthiuram monosulfide DPG: Diphenyl guanidine Antioxidant 810NA: N—isopropyl-N'—phenyl-p-phenylenediamine
*3: Adhesion of the sample to a natural rubber compound (Rubber compound No. 14 mentioned layer)
*4: Adhesion of the sample to a metal.

EXPERIMENT EXAMPLE 3

The weather resistance of rubber compounds Nos. 5-7 shown in Table 2 was compared with that of an ordinary natural rubber compound No. 14 (composed of 100 parts by weight of natural rubber, 20 parts by weight of HAF carbon black, 10 parts by weight of spindle oil, 1.5 parts by weight of sulfur, and 1 part by weight of antioxidant). The results are shown in Table 3.

TABLE 3

| Items | Example 11 | Example 12 | Example 13 | Comparative Example 14 |
|---|---|---|---|---|
| Rubber compound | No. 5 | No. 6 | No. 7 | NR-based |
| Ozone resistance*1 | No cracking after 2000 hours | | | Many cracks after 2 hours |
| Heat aging resistance*2 | | | | |
| Retention of elongation at break | 0.77 | 0.80 | 0.75 | 0.30 |
| Retention of breaking strength | 0.74 | 0.82 | 0.72 | 0.09 |

TABLE 3-continued

| Items | Example 11 | Example 12 | Example 13 | Comparative Example 14 |
|---|---|---|---|---|
| Cycles of flexing until rupture | $7 \times 10^3$ | $12 \times 10^3$ | $5 \times 10^3$ | 20 |

*1: 50% stretched sample in 90 pphm at 40° C.
*2: Measured at 25° C after heat-aging in an air oven at 100° C for 20 days.

It is noted from Table 3 that the high weather resistant rubber compounds suitable for use in the invention are superior in ozone resistance, and have high retention values of elongation, breaking strength, and flex resistance after heat aging. Apparently, they are outstanding in heat aging resistance.

What is claimed is:

1. An anti-seismic bearing comprising a plurality of rigid plates and viscoelastic flexible plates laminated alternately, said flexible plates being made of a material such that the hysteresis ratio at 100% deformation at 25° C. is 0.2 to 0.6, and the ratio $E(-10)/E(30)$ is 1.0 to 3.0, where $E(-10)$ is a storage modulus at 0.01% deformation, 5 Hz, at $-10°$ C. and $E(30)$ is a storage modulus at 0.01% deformation, 5 Hz, at 30° C.

2. An anti-seismic bearing as set forth in claim 1, wherein the flexible plates are made of a material such that the hysteresis ratio at 100% deformation at 25° C. is 0.20 to 0.55, the loss tangent (tan δ) at 0.01% deformation, 5 Hz, at 25° C. is 0.020 to 0.190, and the ratio $E(-10)/E(30)$ is 1.0 to 2.5, where $E(-10)$ is a storage modulus at 0.01% deformation, 5 Hz, at $-10°$ C. and $E(30)$ is a storage modulus at 0.01% deformation, 5 Hz, at 30° C.

3. An anti-seismic bearing as set forth in claim 1, wherein said flexible plates are made of a material such that the hysteresis ratio at 100% deformation at 25° C. is 0.20 to 0.60.

4. An anti-seismic bearing as set forth in claim 1, wherein said flexible plates are made of a material such that the loss tangent (tan δ) at 0.01% deformation, 5 Hz, at 25° C. is 0.010 to 0.194.

5. An anti-seismic bearing as set forth in claim 1, wherein the rigid plates and flexible plates have peripheral parts covered with a rubber material having good weather resistance.

6. An anti-seismic bearing as set forth in claim 5, wherein the weather resistant rubber compound is composed of 100 parts by weight of rubber whose principal component is ethylene-propylene rubber, 10 to 40 parts by weight of cyclopentadiene resin and/or dicyclopentadiene resin, and 5 to 20 parts by weight of rosin derivative.

7. An anti-seismic bearing as set forth in claim 5, wherein the weather resistant rubber compound is composed of 100 parts by weight of rubber whose principal component is ethylene-propylene rubber, 10 to 35 parts by weight of cyclopentadiene resin and/or dicyclopentadiene resin, and 5 to 20 parts by weight of rosin derivative.

8. An anti-seismic bearings as set forth in claim 1, wherein the rigid plates have round peripheral edges which are covered with a viscoelastic flexible material.

9. An anti-seismic bearing as set forth in claim 5, wherein the rigid plates have round peripheral edges.

10. An anti-seismic bearing as set forth in claim 1, wherein the bearing has at least one of the following items I and II;
   (I) the rigid plates situated at upper and lower portions of the bearing have flexural rigidity higher than the rigid plate situated in a center of the bearing;
   (II) the flexible plates situated close to upper and lower portions of the bearing have tensile strength higher than the flexible plate situated in a center of the bearing.

11. An anti-seismic bearing comprising a plurality of rigid plates and viscoelastic flexible plates laminated alternately, said flexible plates being made of a material such that the hysteresis ration at 100% deformation at 25° C. is 0.2 to 0.6, and the ratio $E(-10)/E(30)$ is 1.0 to 3.0, where $E(-10)$ is a storage modulus at 0.01% deformation, 5 Hz, at $-10°$ C. and $E(30)$ is a storage modulus at 0.01% deformation, 5 Hz, at 30° C., wherein the flexible plates are made of a high-loss rubber compound composed of 100 parts by weight of rubber whose principal component is natural rubber and 15 to 100 parts by weight of cyclopentadiene resin and/or dicyclo-pentadiene resin.

12. An anti-seismic bearing as set forth in claim 11, wherein the flexible plates are made of a high-loss rubber compound composed of 100 parts by weight of rubber whose principal component is natural rubber and 20 to 80 parts by weight of cyclopentadiene resin and/or dicyclo-pentadiene resin.

13. An anti-seismic bearing as set forth in claim 11, wherein the rigid plates and flexible plates have peripheral parts covered with a rubber material having good weather resistance.

14. An anti-seismic bearing as set forth in claim 13, wherein the weather resistant rubber compound is composed of 100 parts by weight of rubber whose principal component is ethylene-propylene rubber, 10 to 40 parts by weight of cyclopentadiene resin and/or dicyclopentadiene resin, and 5 to 20 parts by weight of rosin derivative.

15. An anti-seismic bering as set forth in claim 13, wherein the weather resistant rubber compound is composed of 100 parts by weight of rubber whose principal component is ethylene-propylene rubber, 10 to 35 parts by weight of cyclopentadiene resin and/or dicyclopentadiene resin, and 5 to 20 parts by weight of rosin derivative.

16. An anti-seismic bearing as set forth in claim 13, wherein the rigid plates have round peripheral edges.

17. An anti-seismic bearing as set forth in claim 11, wherein the rigid plates have round peripheral edges covered with a viscoelastic flexible material.

18. An anti-seismic bearing as set forth in claim 11, wherein the bearing has at least one of the following items I and II:
   (I) rigid plates situated at upper and lower portions of the bearing having flexural rigidity higher than a rigid plate situated in a center of the bearing;
   (II) flexible plates situated close to upper and lower portions of the bearing having tensile strength higher than a flexible plate situated in a center of the bearing.

19. An anti-seismic bearing as set forth in claim 11, wherein said flexible plates are made of a material such that the hysteresis ratio at 100% deformation at 25° C. is 0.20 to 0.60.

20. An anti-seismic bearing as set forth in claim 11, wherein said flexible plates are made of a material such taht the loss tangent (tan δ) at 0.01% deformation, 5 Hz, at 25° C. is 0.010 to 0.194.

* * * * *